(12) United States Patent
Fors

(10) Patent No.: US 7,130,809 B1
(45) Date of Patent: Oct. 31, 2006

(54) SYSTEM FOR PLANNING A NEW PRODUCT PORTFOLIO

(75) Inventor: John Fors, Menlo Park, CA (US)

(73) Assignee: i2 Technology US, Inc., Dallas, TX (US)

( * ) Notice: Subject to any disclaimer, the term of this patent is extended or adjusted under 35 U.S.C. 154(b) by 1051 days.

(21) Appl. No.: 09/684,075

(22) Filed: Oct. 8, 2000

Related U.S. Application Data

(60) Provisional application No. 60/158,654, filed on Oct. 8, 1999.

(51) Int. Cl.
*G06F 17/60* (2006.01)

(52) U.S. Cl. .................. 705/10; 705/1; 705/7; 705/8; 705/9; 705/35; 705/36; 700/95; 700/96; 707/1; 707/100

(58) Field of Classification Search .............. 705/7–10, 705/1, 35–36; 700/95–96; 707/1, 100
See application file for complete search history.

(56) References Cited

U.S. PATENT DOCUMENTS

| | | | |
|---|---|---|---|
| 5,216,593 A | 6/1993 | Dietrich et al. | 364/402 |
| 5,237,495 A * | 8/1993 | Morii | 705/8 |
| 5,311,438 A * | 5/1994 | Sellers et al. | 700/96 |
| 5,408,663 A | 4/1995 | Miller | 395/650 |
| 5,596,502 A | 1/1997 | Koski et al. | 364/468.01 |
| 5,890,134 A | 3/1999 | Fox | 705/9 |
| 5,893,074 A | 4/1999 | Hughes et al. | 705/8 |
| 5,991,751 A * | 11/1999 | Rivette et al. | 707/1 |
| 6,009,406 A | 12/1999 | Nick | 705/10 |
| 6,023,702 A * | 2/2000 | Leisten et al. | 707/100 |
| 6,029,139 A | 2/2000 | Cunningham et al. | 705/10 |
| 6,032,125 A | 2/2000 | Ando | 705/10 |
| 6,233,493 B1 * | 5/2001 | Cherneff et al. | 700/95 |
| 6,571,215 B1 | 5/2003 | Mahapatro | 705/8 |
| 6,578,005 B1 | 6/2003 | Lesaint et al. | 705/8 |
| 6,578,009 B1 * | 6/2003 | Shinozaki | 705/36 R |
| 6,671,673 B1 * | 12/2003 | Baseman et al. | 705/7 |

FOREIGN PATENT DOCUMENTS

JP    08106494 A  *  4/1996

OTHER PUBLICATIONS

"The fuzzy front end", May 1997, Strategic Direction, n133, pp. 10-13, 4 pgs.*
Cooper et al., "Best practices for managing R&D portfolios", Jul./Aug. 1998, Research-Technology Management, v41n4, pp. 20-33, 14 pgs.*
Khurana et al., "Integrating the fuzzy front end of new product development", Winter 1997, Sloan Management Review, v38n2, pp. 103-120, 20 pgs.*
Fors, "System for Planning New Product Release," U.S. Appl. No. 09/688,032, pending, Oct. 8, 2000.
Cherneff, et al., "System for Scheduling Product Planning," U.S. Appl. No. 09/684,076, pending, Oct. 8, 2000.

* cited by examiner

*Primary Examiner*—John W. Hayes
*Assistant Examiner*—Freda Nelson
(74) *Attorney, Agent, or Firm*—Daren C. Davis; James E. Walton

(57) ABSTRACT

A planning system for developing new products includes resource and projected financial performance information as inputs. By selecting various combinations of possible new products to develop, a planner can determine a product mix that maximizes future profits as well as can actually be implemented using available resources. A product development schedule is generated along with projected financial information.

27 Claims, 3 Drawing Sheets

SYSTEM FOR PLANNING A NEW PRODUCT PORTFOLIO

RELATED APPLICATIONS

This application claims the benefit under 35 U.S.C. § 119(e) of U.S. Provisional Application 60/158,654, filed 8 Oct. 1999, titled INTEGRATED SYSTEM FOR CONSTRAINT-BASED PORTFOLIO AND PIPELINE OPTIMIZATION, which is hereby incorporated by reference. This application also contains material in common with co-pending U.S. application Ser. No. 09/684,076, filed Oct. 8, 2000, titled SYSTEM FOR SCHEDULING PRODUCT PLANNING, and with co-pending U.S. application Ser. No. 09/688,032, filed Oct. 8, 2000, titled SYSTEM FOR PLANNING NEW PRODUCT RELEASE, both of which are hereby incorporated by reference.

BACKGROUND OF THE INVENTION

1. Field of the Invention

The present invention relates generally to planning systems, and more particularly to a system and method for planning a portfolio of new products to be developed.

2. Description of the Prior Art

In today's marketplace, development of new products to be brought to market is becoming of increasing importance. In many industries, product life cycles are becoming shorter, increasing the importance of new product planning and introduction. Planning of new products is usually based upon a decision by management as to what new products will sell the best, and hopefully provide the best profit margins for the company.

It is difficult for a company to determine whether it is selecting the best mix of new products to be developed. Because of shorter lifetimes, the development process itself must be carefully planned so that new products can be brought out in a timely manner. Bringing out new products too late can have a devastating impact on a company's profit margin.

Previously, there did not exist adequate tools to assist corporate management in planning and defining a proper portfolio of new products to be developed. Most companies know what current products are doing well, and which are contributing to the corporate profits, but have less knowledge about which new products under consideration will best contribute to profits in the future.

Planning systems can be used to plan for product development and allocate resources. However, the impact on profits of developing different possible combinations of new products is generally unknown. Because timing considerations can have such a great impact on overall profitability of a new product, timing of its introduction is of primary concern. Present planning tools available to corporate planners do not allow the impact on future profits to be determined for different scenarios for introducing new products.

It would be desirable to provide a system and method for planning development of new products that could consider the impact of product development on product profitability. It would be further desirable for such a system to enable planners to determine a cost of product development as well as impact on future profits.

SUMMARY OF THE INVENTION

In accordance with the present invention, a planning system for developing new products includes resource and projected financial performance information as inputs. By selecting various combinations of possible new products to develop, a planner can determine a product mix that maximizes future profits as well as can actually be implemented using available resources. A product development schedule is generated along with projected financial information.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The system and method described below is useful for planning the development of new product portfolios to be developed. In order to assist a planner in determining an optimum mix of new products, resources and financial results must both be considered. If a new product development project is later than planned, significant loss of potential profits may occur. Therefore, the process for scheduling new product development must include such financial information in order to obtain the best results. A preferred system for assisting planners in their task is referred to herein as a portfolio planner, that is, a system to assist in planning a portfolio of new products to be developed.

Figure 1:
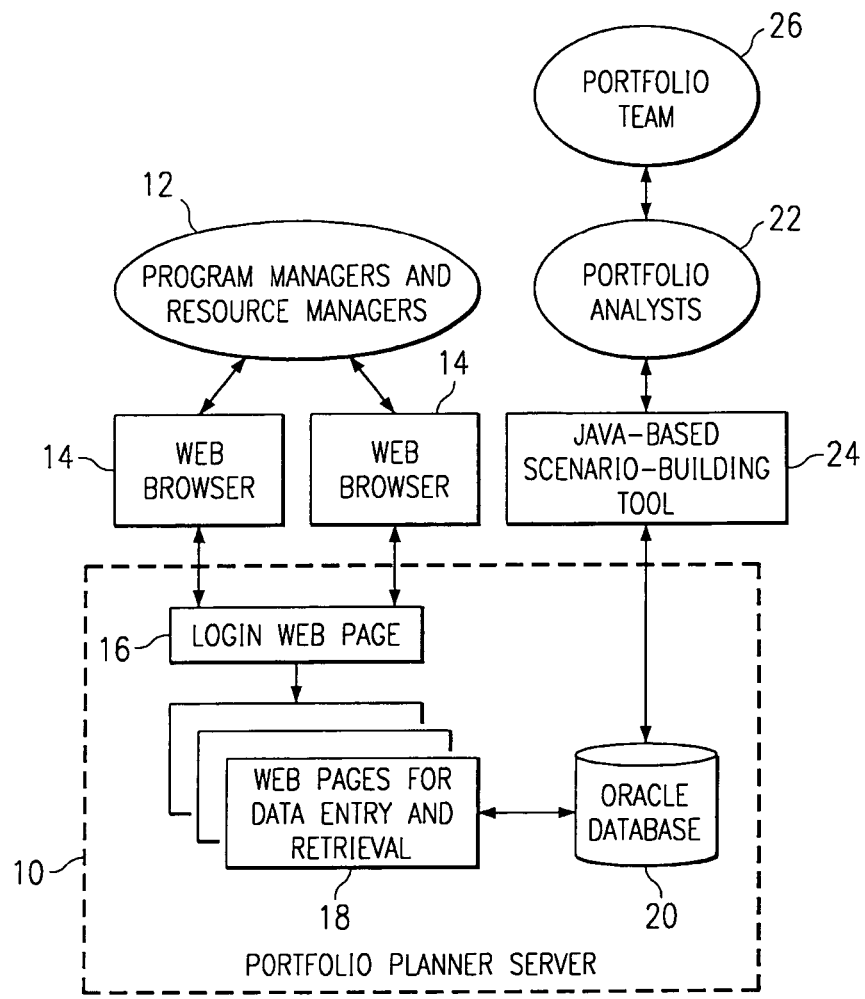
FIG. 1 is a diagram outlining a preferred new product planning process.

FIG. 1 illustrates the planning process generally at a high corporate level. The portfolio planner system resides on a server 10 which is accessed directly or indirectly by the various people involved in the planning process. Those people include program managers and resource managers 12 who preferably access the server 10 through one or more web servers 14. Program managers and resource managers 12 access a login web page 16 that gives them access to the underlying web pages 18 used to manipulate data and generally access an underlying database 20.

Portfolio analysts 22 access the portfolio planner server 10 through various scenario building tools 24 not available to program and resource managers 12. A portfolio team 26 makes final decisions as to which products are to be developed, and determines the various high level strategies to be implemented. They are assisted in their decision making by the analysts 22. It will be appreciated by those skilled in the art that this division of work is only a preferred suggestion, and other high level relationships will work with the system described below.

Figure 2:
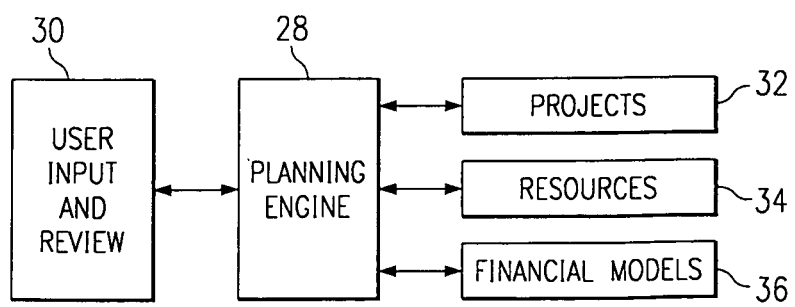
FIG. 2 is a high level block diagram illustrating a preferred approach to new product planning.

FIG. 2 indicates the type of information used by the system to develop an optimum portfolio. Planning engine 28 accepts inputs and generates development plans as described below. Users 30 both provide initial inputs to planning engine 28, and assess results that are generated. Planning engine 28 uses various types of data as inputs, and modifies data as the planning process proceeds. Data regarding projects 32 is used to define what steps are necessary to develop each new product under consideration. Data regarding the resources 34 available to develop new products is required, as is information regarding the financial models 36 that project the impact on profits of developing each product by a set of introduction dates.

A feature that adds to the usefulness of this system is that forward looking financial models are incorporated into the development planning strategy. Because late product introduction can have such a devastating impact on the profit contribution made by a product over its lifetime, it is necessary to consider timing effects in order to develop a useful product development plan. As is discussed in more detail in connection with FIG. 6, the present system provides that different profit projections be provided for various new product introduction dates.

Some portions of the preferred system are similar in nature to planning systems known in the art. Various portions of the preferred system are described in connection with FIGS. 3 through 5.

Figure 3:
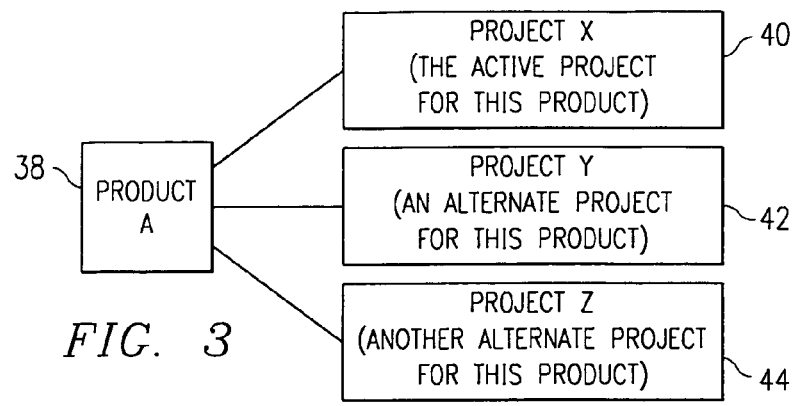
FIG. 3 is a diagram illustrating the use of alternative projects for developing a product.

Referring to FIG. 3, each product under consideration for development may be developed by one or more alternate projects. In this example, Product A can be developed by a project X 40, which is currently selected as the active project for this product. Only one development project is planned for any single product to prevent different development projects for a product from being pursued simultaneously. Portfolio planners can select alternate projects, such as project Y 42 or project Z 44, to assess the impact on overall profitability and scheduling of these alternate projects, but only one project at a time is selected.

Figure 4:
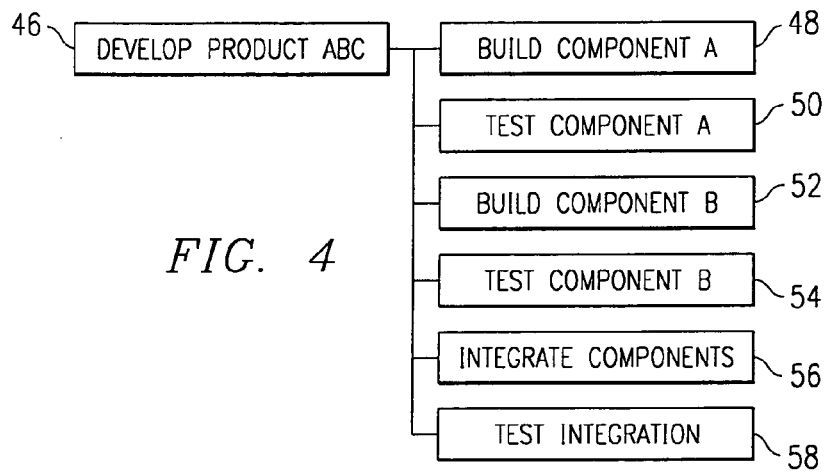
FIG. 4 is a diagram illustrating a plurality of tasks contained in a project.

Referring to FIG. 4, any given project 46 is comprised of a sequence of tasks. A simplified sequence of tasks 48–58 is shown in FIG. 4, and assumes that two components are needed to be developed to come up with a new product. In many cases, many of the components in a new product can be reused from earlier products, and integrating them is the primary concern.

Tasks have constraints that are used to sequence them for planning purposes. Some tasks must be completed before others, and a set of constraint rules is provided to enforce the proper ordering. Other tasks can be complete in parallel, with component development not depending on the development of some of the other product components. These relationships are expressed as a set of constraint rules for each project. The Planning engine enforces these constraints when scheduling development of products. The constraints are especially important when multiple products are being scheduled for concurrent development, which is the most common scenario in which the present system is useful.

Figure 5:
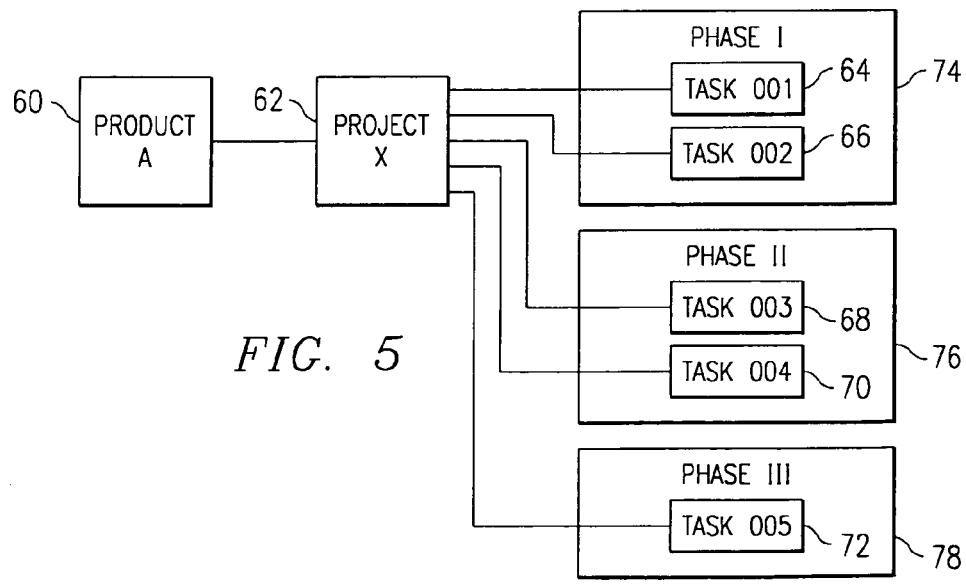
FIG. 5 is a diagram illustrating a project having tasks organized in phases.

Projects may be broken down into phases, which are simply collections of related tasks as defined by those using the system. Referring to FIG. 5, a product A 60 is to be developed through project X 62, which in turn consists of tasks 64–72. These tasks are shown as broken into 3 phases 74, 76, 78, which occur in sequential order. In a planning situation where it is presumed in advance that not all development projects will proceed to completion, the use of project phases can enhance the accuracy of the portfolio projections.

Each task requires certain resources. These can be defined as, for example, a certain number of person days to be made available during a specified timeframe by a specified resource. Each resource has a capacity, defined as the number of person days which are available. This capacity can change over time, and in particular can change depending upon the day of the week, the amount of overtime that can be worked, the impact of holidays, etc. The process of scheduling projects involves scheduling tasks, which uses up available resources. As schedules are developed, the available resources diminish.

When there is a possibility that a project will not be completed, a probability of completion can be assigned in advance to each phase of the project. For example, it can be assumed that the initial phase 74 of the project is 100% likely to be performed. Whether product development continues will depend on the results of the first phase, and a probability of 80% can be assigned, for example, to second phase 76. In this example, assume that the probability of executing the third phase 78 is 50%, once the second phase is completed.

The resources that will be used by project 62 are multiplied by the appropriate probabilities when resource allocation is performed at the planning stage. Thus, the resources that would be needed by the second phase 76 are multiplied by 0.8 to take into account the lesser probability that they will be needed at all. For the third phase 78, the required resources are multiplied by 0.8*0.5=0.4, because the third phase depends on both a decision to be made after second phase 76 completion (50%) and the probability that the second phase will be performed (80%). The resources normally required for each phase are multiplied by the product of all preceding phase probabilities to reach a resource allocation multiplier for that phase for planning purposes.

An important part of the preferred system is the inclusion of financial modeling in the product development planning process. As described above, expected profits over the lifetime of a product are a function of the introduction date of the product, as well as numerous other factors. In general, creating a model projecting the financial return to be expected for a product is known in the art. The preferred system requires that a series of financial projections be run in order to assist the planning process.

Figure 6:
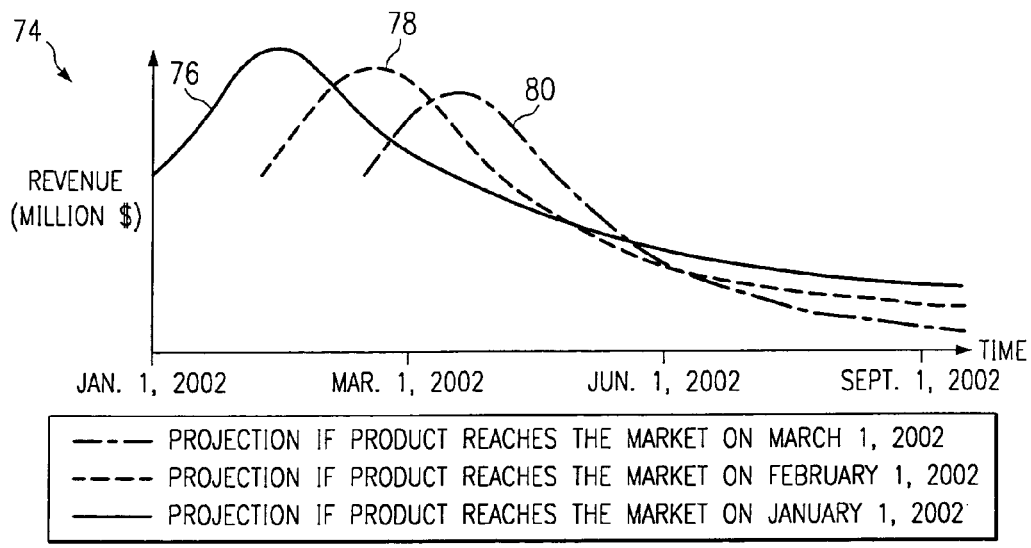
FIG. 6 is a sample set of financial projections over time.

FIG. 6 illustrates a simple example of the time element as it relates to the project projections used in the preferred embodiment. A graph 74 includes three profit curves 76, 78, 80 which are shifted in time to represent different product introduction dates. In this example, the peaks of the curves diminish as the product is introduced later. At some point, there may be only minimal profits if the product is introduced too late. The total profits over the lifetime of a product is found by integrating user the separate profit curves.

Each possible product introduction date will have a corresponding overall profit figure associated with it. Some products may be relatively insensitive to the date of introduction; these products can be developed to be introduced an any convenient time. Other products are extremely time sensitive, and must be developed as quickly as possible. The time impact on product contribution to corporate profits is used as part of the data considered in the optimization process.

Figure 7:
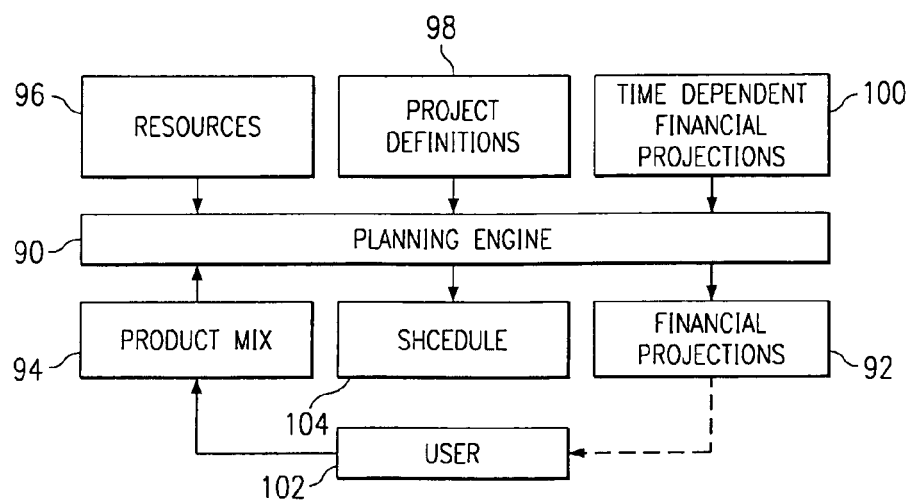
FIG. 7 is a data flow diagram illustrating utilization of the preferred planning system.

The portfolio planning process is a process of optimizing a set of inputs to maximize an output value. In the preferred system, the output to be maximized is the overall profit to be made by products to be developed. This is shown in FIG. 7, in which a planning engine 90 generates an output financial projection 92 consisting of the expected profit to be generated by a given product mix 94. Product mix 94 is provided as an input to planning engine 90, and defines the products that are in the portfolio and available for consideration. Data defining available resources 96, project definitions 98, and time dependent financial projections 100 are also provided.

As described above, resources 96 is a list of all available resources needed to develop new products. Not all resources available to the company need be considered; only those that relate to new product development are of interest. Project definitions 98 are the list of tasks required to develop each possible product, as described above. The financial projections 100 are also as described above. Project definitions 98 and financial projections 100 are provided separately for each possible product to be developed. Resources 96 includes all resources that are available.

The planning process begins when a possible portfolio of new products is provided as the product mix 94. Planning engine 90 generates a schedule 104 for product development in the traditional manner, utilizing the sequence and timing constraints contained in the project definitions. Development projects are scheduled utilizing available resources, and the completion dates for the various projects under consideration generates a dollar number for each product based upon introduction date. Part of the scheduling process is the selection of which products are to be developed; this list is preferably chosen to maximize overall projected profit. A user determines whether the financial result and plan is suitable, and may change the product mix if necessary. The planning process is an open loop process, with the user changing the portfolio in order to determine the impact on overall profitability.

As is normally the case, the scheduling process balances weighted interests to generate a best overall schedule according to its inputs. The present system uses financial projections, which differ depending on introduction date, as a weighted factor in the optimization process. Thus, products which lose significant profitability if they are introduced late are more likely to be scheduled for fastest introduction, while less time sensitive products may be scheduled later. Of course, those products that contribute the most to profitability have a priority in the scheduling process.

In addition to the projected profit number 92, the present system also generates a schedule to control the development process. This schedule is used by project managers to determine their deadlines so that overall corporate schedules and profit targets can be met.

The described system and method include time sensitive profit projects as an integral part of the portfolio planning process. This ensures that not only will all development projects occur in a timely manner, but that those that contribute the most to corporate profits are emphasized. The ability to select the proper portfolio of products to be developed can provide a significant strategic advantage to companies that must constantly introduce new products.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for selecting a portfolio of products to be developed, the method performed using a computer system comprising one or more processing units and one or more memory units, the method comprising:

using the computer system, selecting a set of candidate products to be developed;

using the computer system, calculating a set of financial projections for each candidate product, the set of financial projections for a candidate product providing a future profit determination for each of a set of possible product introduction dates for the candidate product;

using the computer system, for each candidate product, determining based on the set of financial projections an impact that the time of introduction has on profits associated with the candidate product;

using the computer system, providing at least one project definition for each candidate product, such project definitions each including a development schedule and resource requirements, wherein the at least one project definition comprises one or more phases for development of the associated candidate product and each project definition comprises a plurality of ordered tasks for developing the product associated with the project definition, each task comprising a time requirement, a resource requirement and an ordering constraint with respect to the other tasks in the project definition;

using the computer system, providing a set of available resources; and using the computer system, generating a development schedule for the set of candidate products to maximize profit based at least on the determined impact that the time of introduction has on profits associated with each of the candidate products and using the financial projections for the candidate products as a weighted factor in generating the development schedule such that products more affected by time are scheduled for faster production than products less affected by time, the development schedule providing for product development in accordance with project definitions for each of the candidate products and resource constraints; and using the computer system, assigning a probability of completion to each of the one or more phases, the probability of completion for use in allocating resources when generating the development schedule in accordance with the project definitions and the resource constraints;

wherein each phase comprises one or more of the plurality of ordered tasks.

2. The method of claim 1, wherein a candidate product includes at least two project definitions, the method comprising selecting one of the at least two project definitions in the development schedule for generating the development schedule.

3. The method of claim 1, further comprising:

determining, based at least on the sets of financial projections for the candidate products, which products would generate the greatest profits; and prioritizing the candidate products that would generate the greatest profits in generating the development schedule.

4. The method of claim 1, wherein the ordering constraint defines a sequence for the plurality of ordered tasks, the sequence providing one or more of the following:

certain tasks must be completed before other tasks; and certain tasks may be completed in parallel with certain other tasks.

5. The method of claim 1, wherein generating the development schedule comprises enforcing the ordering constraint when scheduling development of products.

6. The method of claim 1, further comprising, for each phase of product development multiplying resources required for the phase by a product of the probability of completion for the phase and the probabilities of completion for all preceding phases.

7. The method of claim 1, further comprising generating as an output a projected profit number in addition to the development schedule.

8. The method of claim 1, wherein:
the set of candidate products define a first product mix;
the generated development schedule for the first product mix comprises a first development schedule; and
the method further comprises:
generating as an output a first projected profit number for the first product mix in addition to generating the first development schedule;
changing, after generating the first development schedule for the first product mix and generating the first projected profit number for the first product mix, the set of candidate products in the first product mix to define a second product mix;
generating a second development schedule for the second product mix; and
generating as an output a second projected profit number for the second product mix in addition to generating the second development schedule, enabling a user to compare the first development schedule and the second development schedule and to compare the first projected profit number and the second projected profit number to determine whether the first product mix or the second product mix is suitable.

9. The method of claim 8, wherein changing the set of candidate products in the first product mix to define a second product mix comprises one or more of:
removing one or more of the products in the set of candidate products of the first product mix;
adding one or more new products to the first product mix; and
altering the project definition of one or more of the products in the set of candidate products of the first product mix.

10. A computer-implemented system for selecting a portfolio of products to be developed, the system comprising:
means for selecting a set of candidate products;
means for selecting a set of financial projections associated with each candidate product, the set of financial projections for a candidate product providing a plurality of profit projections for each of a set for the candidate product;
means for selecting a set of project definitions, at least one project definition associated with each candidate product each of such project definitions comprising a development schedule and resource requirements, wherein the at least one project definition comprises one or more phases for development of the associated candidate product; and
means for selecting a set of available resources;
wherein the system comprises a planning engine operable to:
read in the set of candidate products, the sets of financial projections for the candidate products, the sets of project definitions for the candidate products, and the set of available resources;
select a set of candidate products that meets all resource availability constraints and maximizes profits; and
generate a development schedule for the selected set of candidate products, the financial projections for the candidate products being used by the planning engine as a weighted factor in generating the development schedule such that products more affected by time are schedule for faster production than products less affected by time; and
assign a probability of completion to each of the one or more phases, the probability of completion for use by the planning engine in allocating resources when selecting the set of candidate products that meets all resource constraints and maximizes profits;
wherein at least one of the project definitions comprise a plurality of ordered tasks, with each task containing a time requirements, a resource requirement, and an ordering constraint with respect to the other tasks in the project definition; and
wherein each phase comprises one or more of the plurality of ordered tasks.

11. The system of claim 10, wherein:
one of the candidate products comprises at least two project definitions; and
the planning engine selects one of the at least two project definitions for inclusion in the development schedule.

12. The system of claim 10, wherein the planning engine is operable to:
determine, based at least on the sets of financial projections for the candidate products, which products would generate the greatest profits; and
prioritize the candidate products that would generate the greatest profits in generating the development schedule.

13. The system of claim 10, wherein the ordering constraint defines a sequence for the plurality of ordered tasks, the sequence providing one or more of the following:
certain tasks must be completed before other tasks; and
certain tasks may be completed in parallel with certain other tasks.

14. The system of claim 10, wherein the planning engine is operable to, in generating the development schedule, enforce the ordering constraint when scheduling development of products.

15. The system of claim 10, wherein the planning engine is operable to, for each phase of product development, multiply resources required for the phase by a product of the probability of completion for the phase and the probabilities of completion for all preceding phases.

16. The system of claim 10, wherein the planning engine is further operable to generate as an output a projected profit number in addition to the development schedule.

17. The system of claim 10, wherein:
the set of candidate products defines a sequence for the product mix;
the generated development schedule for the first product mix comprises a first development schedule; and
the planning engine is further operable to:
generate as an output a first projected profit number for the first product mix in addition to generating the first development schedule;
change, after generating the first development schedule for the first product mix and generating the first projected profit number for the first product mix, the set of candidate products in the first product mix to define a second product mix;
generate a second development schedule for the second product mix; and
generate as an output a second projected profit number for the second product mix in addition to generating the second development schedule, enabling a user to compare the first development schedule and the second development schedule and to compare the first projected profit number and the second projected prost number to determine whether the first product mix or the second product mix is suitable.

18. The system of claim 17, wherein, in changing the set of candidate products in the first product mix to define the second product mix, the planning engine is operable to:
remove one or more of the products in the set of candidate products of the first product mix;
add one or more new products to the first product mix; and
alter the project definition of one or more of the products in the set of candidate products of the first product mix.

19. Software for selecting a portfolio of products to be developed, the software being embodied in computer-readable media and when executed by a computer system operable to:
select a set of candidate products to be developed;
calculate a set of financial projections for each candidate product, the set of financial projections for a candidate product providing a future profit determination for each of a set of possible product introduction dates for the candidate product;
for each candidate product, determine based on the set of financial projections an impact that the time of introduction has on profits associated with the candidate product;
provide at least one project definition for each candidate product, such project definitions each including a development schedule and resource requirements, wherein each project definition comprises a plurality of ordered tasks for developing the product associated with the project definition, each task comprising a time requirement, a resource requirement, and an ordering constraint with respect to the other tasks in the project definition and at least one project definition comprises one or more phases for development of the associated candidate product, each phase comprising one or more of the plurality of ordered tasks;
provide a set of available resources;
generate a development schedule for the set of candidate products to maximize profit based at least on the determined impact that the time of introduction has on profits associated with each of the candidate products and using the financial projections for the candidate products as a weighted factor in generating the development schedule such that products more affected by time are scheduled for faster production than products less affected by time, the development schedule providing for product development in accordance with project definitions for each of the candidate products and resource constraints; and
assign a probability of completion to each of the one or more phases, the probability of completion for use in allocating resources when generating the development schedule in accordance with the project definitions and the resource constraints.

20. The software of claim 19, wherein a candidate product includes at least two project definitions, the software operable to select one of the at least two project definitions in the development schedule for generating the development schedule.

21. The software of claim 19, further operable to:
determine, based at least on the sets of financial projections for the candidate products, which products would generate the greatest profits; and
prioritize the candidate products that would generate the greatest profits in generating the development schedule.

22. The software of claim 19, wherein the ordering constraint defines a sequence for the plurality of ordered tasks, the sequence providing one or more of the following:
certain tasks must be completed before other tasks; and
certain tasks may be completed in parallel with certain other tasks.

23. The software of claim 19, further operable to, in generating the development schedule, enforce the ordering constraint when scheduling development of products.

24. The software of claim 19, further operable to, for each phase of product development, multiply resources required for the phase by a product of the probability of completion for the phase and the probabilities of completion for all preceding phases.

25. The software of claim 19, further operable to generate as an output a projected profit number in addition to the development schedule.

26. The software of claim 19, wherein:
the set of candidate products define a first product mix;
the generated development schedule for the first product mix comprises a first development schedule; and
the software is further operable to:
generate as an output a first projected profit number for the first product mix in addition to generating the first development schedule;
change, after generating the first development schedule for the first product mix and generating the first projected profit number for the first product mix, the set of candidate products in the first product mix to define a second product mix;
generate a second development schedule for the second product mix; and
generate as an output a second projected profit number for the second product mix in addition to generating the second development schedule, enabling a user to compare the first development schedule and the second development schedule and to compare the first projected profit number and the second projected profit number to determine whether the first product mix or the second product mix is suitable.

27. The software of claim 26, wherein changing the set of candidate products in the first product mix to define a second product mix comprises one or more of:
removing one or more of the products in the set of candidate products of the first product mix;
adding one or more new products to the first product mix; and
altering the project definition of one or more of the products in the set of candidate products of the first product mix.

* * * * *